United States Patent [19]

Amann et al.

[11] 4,139,575
[45] Feb. 13, 1979

[54] POLYOXYMETHYLENE MOLDING COMPOSITION CONTAINING MELAMINE FORMALDEHYDE POLYCONDENSATE

[75] Inventors: Herbert Amann; Gerhard Morlock, both of Hanau, Fed. Rep. of Germany

[73] Assignee: Deutsche Gold- und Silber-Scheideanstalt vormals Roessler, Frankfurt Main, Fed. Rep. of Germany

[21] Appl. No.: 715,802

[22] Filed: Aug. 19, 1976

[30] Foreign Application Priority Data

Sep. 10, 1975 [DE] Fed. Rep. of Germany ....... 2540207

[51] Int. Cl.$^2$ ............................................. C08L 61/32
[52] U.S. Cl. ...................................... 260/849; 260/6; 528/254
[58] Field of Search ............... 260/849, 6 (U.S. only), 260/67.6 R(U.S. only)

[56] References Cited

U.S. PATENT DOCUMENTS

| 3,063,960 | 11/1962 | Smith ................................... 260/849 |
| 3,200,090 | 8/1965 | Dolce et al. ............................... 260/6 |
| 3,428,607 | 2/1969 | Renner ........................... 260/67.6 R |
| 3,509,098 | 4/1970 | Curchod et al. ................ 260/67.6 R |
| 3,641,196 | 2/1972 | Sander et al. ......................... 260/849 |
| 3,836,605 | 9/1974 | Ricker et al. ......................... 260/849 |

FOREIGN PATENT DOCUMENTS

| 1243873 | 7/1967 | Fed. Rep. of Germany ........... 260/849 |
| 1694097 | 8/1971 | Fed. Rep. of Germany ........... 260/849 |
| 1029389 | 5/1966 | United Kingdom ..................... 260/849 |

*Primary Examiner*—Lucille M. Phynes
*Attorney, Agent, or Firm*—Beveridge, Degrandi, Kline & Lunsford

[57] ABSTRACT

In a molding composition comprising a polyoxymethylene, a melamine formaldehyde polycondensate and an antioxidation agent, the improvement wherein said melamine formaldehyde polycondensate is a finely divided, cross-linked, substantially water insoluble polycondensate comprising the precipitation product obtained by reacting formaldehyde and melamine in a molar ratio between 1.2 : 1 and 10.0 : 1; and wherein said polycondensate is in an amount of about 0.001 to about 30 percent by weight, related to the total weight of said composition.

20 Claims, No Drawings

POLYOXYMETHYLENE MOLDING COMPOSITION CONTAINING MELAMINE FORMALDEHYDE POLYCONDENSATE

BACKGROUND OF THE INVENTION

1. Field of the Invention

This invention relates to molding materials comprised of a polyoxymethylene, a melamine-formaldehyde polycondensate, an antioxidant, and optionally, other customary additives to polyoxymethylene molding materials.

2. Discussion of the Prior Art

In published German application No. 1 694 097 there are described polyoxymethylene molding materials containing a polyoxymethylene, an antioxidant and 0.05 to 5% of a water soluble melamine formaldehyde polycondensate or melamine-dicyandiamide-formaldehyde-mixed polycondensation product. The polycondensates described are not stable, however, at elevated temperatures, and dissociate, at least partially, into melamine and formaldehyde. As a result, a part of the melamine escapes during processing. In the production of molded articles, "blisters" and discoloration occur. The polycondensates can also be at least partially extracted by water from finished molded articles.

SUMMARY OF THE INVENTION

This invention aids in overcoming these disadvantages by providing a molding composition comprising a polyoxymethylene, a melamine formaldehyde polycondensate and an antioxidation agent. More particularly, this invention provides an improvement wherein said melamine formaldehyde polycondensate is a finely divided, cross-linked, substantially water insoluble polycondensate comprising the precipitation product obtained by reacting formaldehyde and melamine in a molar ratio between 1.2:1 and 10.0:1. The polycondensate comprises about 0.001 to about 30 percent by weight of the total weight of the composition. The composition can optionally contain at least one conventional polyoxymethylene molding additive. A molded article and the composition in moldable form are also provided.

The precipitation polycondensates, which are employed as stabilizers in this invention, are not meltable and are insoluble in molten polyoxymethylenes. Therefore, it is surprising that they cause a considerable improvement in the thermal stability of polyoxymethylenes when employed in combination with antioxidants. Also, the polycondensates are stable at elevated temperatures and discharge hardly any volatile fission products. No "blisters" occur on molded articles and no coatings occur on processing equipment. No secondary cross-linking occurs either. Therefore, fouling or discoloration of the molding materials of this invention is practically impossible, even if the polycondensates are incorporated into polymers with depolymerizable formaldehyde.

DETAILED DESCRIPTION

The finely distributed, cross-linked, substantially water insoluble precipitation polycondensates have specific surfaces up to about 250 m$^2$/g, and a primary particle size which is overwhelmingly smaller than about 1 μm, and at least part being smaller than 0.1 μm. At the same time, they have a nucleating effect on the polyoxymethylene melt. Their share of polyoxymethylene molding materials of this invention amounts to about 0.001 to about 30% by weight, preferably about 0.01 to about 5% by weight, especially about 0.08 to about 1.0% by weight.

The precipitation polycondensates can be produced by the well-known method of first of all converting formaldehyde and melamine in a mole ratio of formaldehyde:melamine between 1.2:1 and 10:1, preferably between about 1.2:1 and about 2.0:1, in an aqueous solution or dispersion into a soluble precondensate, which then subsequently is cross-linked and precipitated. During the production of the soluble precondensate, one can operate in a wide range of concentrations, for example, from about 5 to about 45% by weight of polymer forming substances. The condensation takes place in a weakly alkaline environment at temperatures of preferably about 50° to about 80° C., whereby the melamine passes over into a solution by addition of formaldehyde. The time necessary for this depends, apart from the temperature, essentially on the mole ratio of formaldehyde:melamine. The greater this ratio is, the more quickly will the melamine pass over into solution. In the case of the temperature stated, one will obtain a homogeneous solution after about 30 to about 60 minutes. Subsequently, the precondensate is acidified while being stirred vigorously, and is heated for about 1 to about 2 hours to a temperature between about 70° C. and about 100° C. At the same time, a further condensation occurs while forming cross-linkages and precipitating the cross-linked polycondensate. The cross-linking reaction can also be carried out in such a way that the precondensate is inserted gradually into acidified hot water. Naturally, higher temperatures and longer condensation times than the one stated can also be employed. This can be effective whenever the finely distributed cross-linked polycondensates are employed in the form in which they are obtained, namely, as aqueous dispersions, rather than in isolated form. As a result of that, small quantities of water soluble condensation products, which may still be present in the reaction mixture, are likewise cross-linked and become water insoluble. The cross-linking is preferably carried out in a pH range of about 5.0 to about 6.9, especially about 6.0 to about 6.9.

The desired pH can be more easily maintained by employing buffers. Whenever the finely distributed cross-linked polycondensate is employed as a dispersion (in the form as obtained after polycondensation), it may be effective to keep the salt content of the dispersion as low as possible by using as little as possible or no additional base at all (except melamine and possibly other basic compounds that can be condensed in) during the precondensation. Melamine dissolves even without the use of an additional base in an aqueous formaldehyde solution, whenever the molar ratio of formaldehyde:melamine is no greater than about 4.

It will be particularly advantageous, if even during the production of the precondensate, but especially prior to the cross-linking, one or more protective colloids are added. Suitable protective colloids are, for example, tragacanth; agar-agar; starch; methylcellulose; polyvinyl alcohol; copolymers of acrylonitrile, sodium acrylate and acrylamide; copolymers of styrene and maleic acid; ethylene oxide-propylene oxide-block copolymers; hydroxyethylated fatty alcohols; alkaline salts of polyoxycarboxylic acids, of methacrylic acid-methacrylic acid methyl ester-copolymers and of carboxy methylated starch. Particularly preferred protective colloids are gelatins and carboxymethylcellulose (as Na salts) or mixtures of these substances. The protective colloids are effectively employed in quantities of about 0.1 to about 10% by weight, preferably about 0.5 to about 5.0% by weight, related to the weight of the formaldehyde and melamine. Besides being dependent upon the effectiveness of the protective colloid, the quantity of protective colloid employed depends above all on the concentration of the polymer formers. With increasing concentration of polymer forming substances for the same protective colloid portion (related to the polymer former) the precipitate becomes coarser. This effect can be counteracted by increasing the portion of the protective colloid. The precipitation polycondensation, even in case of concentrations of 20% melamine and formaldehyde, still results in very finely dispersed products whenever particularly effective protective colloids, such as sodium carboxymethylcellulose, are employed. In certain circumstances, the protective colloids are partially incorporated into the polycondensates.

The melamine participates in the cross-linking reaction almost completely. The conversion of the formaldehyde, on the other hand, decreases with decreasing concentration and with a rising mole ratio of formaldehyde:melamine. In the case of a concentration of 20% of polymer former in the mixture and in case of a mole ratio of formaldehyde:melamine = 2, about 95% of formaldehyde is incorporated; at a mole ratio of formaldehyde:melamine = 6, only about 70% of the formaldehyde is incorporated.

In the finely distributed cross-linked water insoluble precipitation polycondensates employed in this invention, up to 20 mole percent of the melamine can be replaced by one or more other substances which can be condensed with it. Examples of such substances are amidine compounds, such as dicyandiamide or 2,5-diamino-1,3,4-triazol; urea and urea derivatives, for example, ethylene urea; amides, such as malonamide or isophthalic acid diamide; aliphatic amines, such as monoethanol amine or diethanol amine; aromatic amines, such as o-toluidine, p-toluidine or p-phenylenediamine; aminoamides, such as p-aminobenzamide; phenol and sterically inhibited (blocked) phenols, such as 2,4-di-tert. butylphenol; hydrazines and hydrazides, for example, N,N'-bis-(3',5'-di-tert. butyl-4'-hydroxyphenyl)-propionylhydrazine. The production of such mixed polycondensates takes place in the manner described using a corresponding starting mixture. Under certain circumstances this may necessitate a longer condensation period and/or a higher reaction temperature.

The precipitation polycondensates can be worked into the polyoxymethylene as the dispersion obtained during the production, possibly after adjustment of the pH value to the desired range, as a moist product from a centrifuge, as a dispersion of filtered and washed product, as a dry powder, possibly after a preceding wet or dry grinding, as a concentrate ("master-batch") after mixing and possibly homogenizing with a polyoxymethylene or some other polymer compatible with polyoxymethylene. The working into the polyoxymethylene can be accomplished discontinuously or preferably continuously in kneading machines, effectively at temperatures above the polyoxymethylene melting point. The addition is accomplished directly or after preceding mixing in suitable apparatus, possibly with simultaneous or subsequent drying.

Under certain circumstances, it is advantageous to add basic substances, for example, alkali metal hydroxides, alkaline earth metal hydroxides, salts, especially alkali and/or alkaline earth metal salts of weak mono- or multibasic inorganic or organic acids during working in of the precipitation polycondensates into the polyoxymethylenes. Such additives are preferably employed in a dissolved form. They can be added already to the precipitation polycondensate or to its dispersion, but they can also be mixed in simultaneously into the polyoxymethylene. The quantity of basic additives to be employed depends, among other things, on the acid content of the precipitation polycondensates and of other additives, but also on acid content of the polyoxymethylene itself, and even further on the quantity of acid possibly developing during the working in. It can easily be determined by experiments. Too large an addition of basic substances will impair the stability of the finished molding materials, while in the case of too small an addition, the decomposition of any possibly existing unstable portions will not take place rapidly enough.

The main component of the polyoxymethylenes forming the molding materials of this invention can be homopolymers of formaldehyde or trioxane, or copolymers of trioxane. They can have a linear structure, but they can also be branched or cross-linked. They can be employed individually or as mixtures. Reference herein to homopolymers of formaldehyde or trioxane is to be understood as including such polymers the hemiacetalic hydroxyl terminal groups of which are stabilized chemically against decomposition, for example, by esterification or etherification. It will be understood that the copolymers of trioxane include copolymers made from trioxane and at least one compound copolymerizable with trioxane. Such compounds copolymerizable with trioxane are, for example, cyclic ethers having 3 to 5, preferably 3 ring links; cyclic acetals, especially formals having 5 to 11, preferably 5 to 8 ring links; and linear polyacetals, especially polyformals. The above-mentioned co-components are employed in quantities of about 0.01 to about 20, preferably about 0.1 to about 10, especially about 1 to about 5% by weight.

Particularly suitable as comonomers are compounds of the formula:

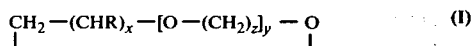

in which R signifies a hydrogen atom, an alkyl radical having 1 to 6, preferably 1, 2 or 3 carbon atoms, which can be substituted by 1, 2 or 3 halogen atoms, preferably chlorine atoms; an alkoxymethyl radical having 2 to 6, preferably 2, 3 or 4 carbon atoms; a phenyl radical or a phenoxymethyl radical; x is a whole number from 1 to 3, when y = 0; y is a whole number from 1 to 3, when x = 0 and z = 2; z is a whole number from 3 to 6, preferably 3 or 4, when x = 0 and y = 1.

Epoxides, for example, ethylene oxide, styrene oxide, propylene oxide and epichlorohydrin, as well as glycidyl ethers of mono- or multivalent alcohols or phenols are suitable above all as cyclic ethers.

Suitable above all as cyclic acetals are cyclic formals of aliphatic or cycloaliphatic α,ω-diols having 2 to 8, preferably 2, 3 or 4 carbon atoms, the carbon chain of which can be interrupted at intervals of 2 carbon atoms by an oxygen atom, for example, glycol formal (1,3- dioxolane), propanediol formal (1,3-dioxane), butanediol formal (1,3-dioxepane) and diglycol formal (1,3,6-trioxocane), as well as 4-chloromethyl-1,3-dioxolane, hexanediol formal (1,3-dioxonane) and butenediol formal [1,3-dioxacycloheptene-(5)]. However, diformals, for example, diglycerin diformal, are also suitable, especially for the production of terpolymers of trioxanes. Both homo- or copolymers of the previously defined cyclic acetals, as well as linear condensates from aliphatic or cycloaliphatic α,ω-diols, with aliphatic aldehydes or thioaldehydes are suitable as linear polyacetals. Especially preferred are the homopolymers of cyclic formals of aliphatic α,ω-diols having 2 to 8, preferably 2, 3 or 4 carbon atoms, such as poly-(1,3-dioxolane), poly(1,3-dioxane) and poly(1,3-dioxepane).

The viscosity of the polyoxymethylene employed in this invention is generally at least about 30 ml/g (measured in a solution of the polymer in dimethylformamide, which contains 2% by weight of diphenylamine, at 135° C. at a concentration of 0.5 g/100 ml). The crystallite melting point of the polyoxymethylene lies in the range of about 140° to about 180° C., preferably about 150° to about 170° C. The density is about 1.38 to about 1.45 g/ml, preferably about 1.40 to about 1.43 g/ml (measured according to DIN 53 479; DIN is an abbreviation for German Industrial Standard).

The preferred binary or tertiary trioxane-copolymers employed in this invention are produced by polymerization of the monomers in the presence of cationic catalysts at temperatures between about 0° and about 150° C., preferably about 70° to about 140° C. (cf., for example, German published application 1 420 283). In this case, for example, Lewis-acids, such as borontrifluoride and antimony pentafluoride and complex compounds of Lewis-acids, preferably etherates, such as borontrifluoride-diethyl-etherate and borontrifluoride-di-tert. butyletherate, are employed as catalysts. Furthermore, proton acids, such as perchloric acid, as well as salt-like compounds, for example, triphenylmethylhexafluorophosphate, triethyloxoniumtetrafluoroborate, acetylperchlorate, or esters of perchloric acid, such as methoxymethylperchlorate or tert. butylperchlorate, are also suitable. For the purpose of regulating molecular weight, one can employ any substance which is known to act as a chain transfer agent in the polymerization of trioxane. The polymerization can take place in the bulk, suspension or solution. For the removal of unstable portions, the copolymers can be subjected to a thermally or hydrolytically controlled partial decomposition up to the primary alcohol terminal groups (cf., German Published applications Nos. 1 445 273 and 1 445 294). However, it is particularly preferred to use the crude copolymers directly and to carry out any possibly necessary decomposition simultaneously with the working in of the precipitation polycondensate.

The homopolymers of formaldehyde or trioxane that can be employed in this invention can be prepared in a known manner by catalytic polymerization of the monomer (cf., for example, German Published application Nos. 1 037 705 and 1 137 215).

The molding materials of this invention must also contain an antioxidation agent in order to protect against the harmful influence of oxygen in the atmosphere, especially at elevated temperatures. Preferably, phenolic antioxidation agents are employed, and above all such compounds having 2 to 6 hydroxyphenyl radicals in the molecule. Especially suitable are compounds of the formula:

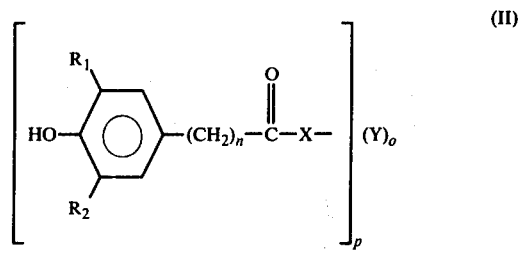

in which $R_1$ signifies a methyl radical or a branched alkyl radical having 3 to 8 carbon atoms; $R_2$ signifies a branched alkyl radical having 3 to 8 carbon atoms; X signifies an oxygen atom or the group —NH—; Y signifies a bi- to hexavalent straight-chained or branched aliphatic radical, the chain of which can be interrupted by a cyclohexylene or phenylene radical, oxygen or sulfur atoms; n signifies zero or a whole number from 1 to 6, preferably 2; o signifies the number 1; and p is a whole number from 2 to 6; or when X is —NH— o can also be zero and p can equal 2.

Compounds of the following formula are also well suited:

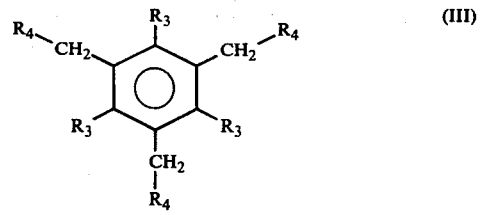

in which $R_3$ signifies an alkyl radical having 1 to 4 carbon atoms; $R_4$ signifies the radical

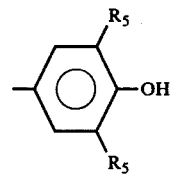

and $R_5$ signifies a branched alkyl radical having 3 to 8 carbon atoms.

Examples of the antioxidants that can be employed in this invention are ethanediol-bis-3-(3',5'-di-tert. butyl-4'-hydroxyphenyl)propionate; 2,2-dimethyl-propanediol-bis-3'-(3'',5''-di-tert. butyl-4'''-hydroxyphenyl)-propionate; hexanediol-bis-(3,5-di-tert. butyl-4-hydroxybenzoate); and N,N'-ethylene-bis-(3,5-di-tert. butyl-4-hydroxy-benzamide). Particularly suitable are N,N'-bis-3-(3',5'-di-tert. butyl-4'-hydroxyphenyl)-propionylhydrazine; hexanediol-bis-3-(3',5'-di-tert. butyl-4'-hydroxyphenyl)-propionate; N,N'-hexamethylene-bis-3-(3',5'-di-tert. butyl-4'-hydroxyphenyl)-propionamide; tetrakis-[methylene-3-(3',5'-di-tert. butyl-4'-hydroxyphenyl)-propionate]-methane; and 1,3,5-trimethyl-2,4,6-tris-(3',5'-di-tert. butyl-4'-hydroxyphenyl)-benzol. The antioxidants are employed in quantities of about 0.001 to about 2, preferably about 0.1 to about 1.0% by weight, related to the weight of the polyoxymethylene.

The molding materials of this invention can also contain customary amounts of other additives conventionally employed in polyoxymethylene molding materials.

Examples of such other additives are: other heat stabilizers known per se, for example, condensation products of carboxylic acid amides, such as oxalic acid, malonic acid, isophthalic acid, terephthalic acid diamide and trimesinic acid triamide, difficulty volatile s-triazine derivatives, such as melam, melem and melon; UV absorbers and light protective agents, for example, 2-(2'-hydroxyphenyl)-benztriazole; 2,4-bis-(2'-hydroxyphenyl)-6-alkyl-s-triazine, 4-hydroxybenzophenone, 1,3-bis(2'-hydroxybenzoyl)-benzol derivatives and oxalic acid diamides, such as oxalic acid dianilide; fillers and/or reinforcing substances in a powdery, fibrous, flaky or other suitable form, for example, from metals, metal alloys, metal oxides, carbonates and silicates, such as iron, aluminum, copper, aluminum oxide, titanium dioxide, precipitated silicic acid, calcium carbonate, kaolin, mica, asbestos, or from glass, carbon, organic polymers, such as cellulose, polyamides, polyesters, polyacrylonitrile, polyvinyl alcohol, polyurethanes, butadiene polymers, copolymers or terpolymers; lubricants, for example, graphite, molybdenum disulfide, polytetrafluoroethylene; auxiliary processing agents, for example, fatty acid esters, amides and salts; nucleating agents, for example, talcum, antimony trioxide, finely distributed pyrogenic silicic acid, finely distributed pyrogenic silicic acid hydrophobed by reaction on OH groups, or 2,4-diamino-6-hydroxy-s-triazine; pigments or dyes, such as barium sulfate, lithopones, cadmium colors, chromium oxide colors, phthalocyanine dyes; acid acceptors, such as polynuclear aromatic amines, basic oxides, hydroxides and salts; fire-retardant substances, for example, red phosphorus.

The molding materials of this invention are prepared by mixing the components available effectively and overwhelmingly in a powdery or granular form and by subsequent homogenizing. Individual components, however, can also be added in solution or in a dispersed form either in the mixing or later in the homogenizing apparatus. When polyoxymethylenes produced in bulk by (Co) polymerization of trioxane and obtained in the form of fairly large blocks are employed, it will be very advantageous to spray on a dispersion of the precipitation polycondensate onto the still hot polymerizate immediately after polymerization, prior to, during or after crushing. As a result of that, a quick cooling of the polymerizate will be achieved, and any oxidative damage will be avoided.

The mixing customarily takes place at ambient temperature, preferably at a temperature of about 15° to about 30° C. The homogenizing takes place in any heatable mixing apparatus, for example, rollers, calanders, kneaders or extruders, at a temperature above the crystallite melting point of the polyoxymethylene, i.e., at a temperature of about 150° to about 250° C., preferably about 170° to about 220° C. During the mixing, and above all during the homogenizing, a disagglomeration of the cross-linked melamine-formaldehyde polycondensates takes place. In the finished molding material, the overwhelming part of the particles from the cross-linked melamine-formaldehyde polycondensates has a size of less than about 10 μm, preferably less than about 5 μm, especially less than about 2 μm.

This invention will be explained in more detail in the following Examples, in which all parts, proportions, percentages and ratios are by weight unless otherwise indicated. The solidification time given in a few Examples is determined in such a way that samples of 3.0 mg of weight for each are heated in a differential scanning calorimeter ("Perkin Elmer DSC 2") at a rate of 40° C./min. up to 190° C., are maintained for 5 minutes at this temperature, are cooled at a rate of 40° C./min. to 149° C., and are then maintained at this temperature. The time up to reaching the maximum of the liberated crystallization heat, counted from the time of reaching 149° C., is measured.

PRODUCTION OF A TRIOXANE COPOLYMER

A mixture of 2500 g of trioxane, 69 g of 1,3-dioxepane and 4 g of butylal is mixed intensively at 80° C. with 15 ml of a solution of t-butylperchlorate in 1,2-dimethoxyethane (0.2 g/l), and is then polymerized in an open vessel at about 5 cm of filling height. After 4 minutes, the polymerization is stopped by grinding the resulting hot polymer block, and quenching the ground material in desalinated water. The resulting copolymer is then filtered off, washed and dried for 3 hours at 65° C./20 torr. This trioxane copolymer is employed in the following Examples.

EXAMPLE 1

(a) Production of a Melamine-formaldehyde Polycondensate

A mixture of 162 g of a 37% formaldehyde solution (2 mole formaldehyde), 50 ml of desalinated water and 2 g of a 50% aqueous solution of monoethanolamine dihydrogen phosphate is adjusted to a pH of 7.0 by the addition of 2N NaOH. Then 63 g of melamine (0.5 mole) are added, and this is heated to 60° C. while stirring. After dissolution of the melamine, the pH value is 7.4. After 30 minutes, the precondensate is added drop by drop into a hot solution of 75° C. comprising 2000 ml of desalinated water and 2.5 g of sodium carboxymethyl cellulose (average degree of substitution 0.2, viscosity in 2% by weight solution measured according to Hoppler at 20° C.: 29 cP), the pH value of which had been previously adjusted to 6.0 by the addition of 10% sulfuric acid. After 21 minutes, the dropping in is completed, the temperature now is raised to 90° C. and the condensation is continued for 1.5 hours at this temperature. Subsequently, the pH value is adjusted to 7.5 by the addition of 2N NaOH, the polycondensate is filtered in its still hot state, washed with water and acetone, and the polycondensate is dried at 80° C./20 torr. Yield: 88 g of MF-polycondensate.

(b) Production of a Molding Material According to the Invention 1000 g of the trioxane copolymer previously prepared, 4 g of MF-polycondensate, 4 g of hexanediol-bis-3-(3',5'-di-tert. butyl-4'-hydroxyphenyl)-propionate and 6 ml of an aqueous 0.1% sodium carbonate solution are mixed in a fluid mixer. The mixture is then homogenized in a two-screw extruder at 150 rpm while being degassed by 4 degassing connections, and is then extruded in strands, cooled in a water bath and finely granulated. The temperature of the mass in the first three zones of the extruder is 200° to 220° C., in the fourth zone 210°–215° C., and in front of the nozzle about 210° C. The dry granulate loses 3.6% of its weight during 2 hours of heating at 220° C. in air. Solidification time is 11.2 seconds. The stability is considerably better and the solidification time much shorter than in the case of a comparative product without melamine-formaldehyde polycondensate.

COMPARATIVE EXAMPLE 1

1000 g of the trioxane copolymer and 4 g of hexanediol-bis-3-(3',5'-di-tert. butyl-4'-hydroxyphenyl)-propionate are mixed, homogenized, extruded and processed just as described in Example 1(b). The comparative product loses 7.1% of its weight during 2 hours of heating to 220° C. in air. The solidification time is 44.8 seconds.

EXAMPLE 2

1000 g of the trioxane copolymer and 1 g of the MF-polycondensate from Example 1(a), as well as 4 g of hexanediol-bis-3-(3',5'-di-tert. butyl-4'-hydroxyphenyl)-propionate and 2 ml of an aqueous 0.1% sodium carbonate solution are homogenized, extruded and processed as described in Example 1(b). The loss in weight of the product after 2 hours heating to 220° C. in air is 5.1%. The solidification time is 23.8 seconds.

EXAMPLE 3

(a) Production of a Melamine-formaldehyde Polycondensate

A precondensate is produced as described in Example 1(a) and is allowed to run while stirring it intensively within 22 minutes into a 75° C. hot solution of 2.5 g of gelatin (DAB 7) in 1090 ml of desalinated water adjusted to pH 6. Further processing takes place as stated in Example 1(a). Yield: 101.5 g.

(b) Production of a Molding Material According to the Invention 1000 g of the trioxane copolymer, 4 g of MF-polycondensate, 4 g of hexanediol-bis-3-(3',5'-di-tert. butyl-4'-hydroxyphenyl)-propionate and 6 ml of an aqueous 0.1% sodium carbonate solution are homogenized, extruded and further processed as described in Example 1(b).

The loss of weight of the product after 2 hours of heating in air at 220° C. amounts to 2.3%. The solidification time is 24.0 seconds.

EXAMPLE 4

(a) Production of a Melamine-formaldehyde Polycondensate

A mixture of 126 g of melamine (1 mole), 324 g of 37% formaldehyde solution (4 mole formaldehyde), 2000 ml of desalinated water and 6 g of polyvinyl alcohol (degree of hydrolysis 98–99 mole %, viscosity of a 4% aqueous solution in the Hoppler viscosimeter DIN 53 015 at 20° C.: approximately 4 cP) is adjusted with 2N NaOH to pH 9 and is stirred for 30 minutes at 75° C. After that, this is adjusted with a 10% sulfuric acid solution to a pH 6.0, the temperature is raised after the beginning of the precipitation to 90° C., and the polycondensation is continued at this temperature for 1.5 hours. The further processing takes place as stated in Example 1(a). Yield: 190 g.

(b) Production of a Molding Material According to the Invention 1000 g of the trioxane copolymer, 4 g of MF-polycondensate, 4 g of hexanediol-bis-3-(3',5'-di-tert. butyl-4'-hydroxyphenyl)-propionate and 1 ml of an aqueous 0.1% sodium carbonate solution, are homogenized, extruded and processed further as described in Example 1(b).

The loss in weight of the product after 2 hours of heating in air at 220° C. amounts to 2.2%. The solidification time is 17.8 seconds.

EXAMPLE 5

(a) Production of a Melamine-formaldehyde Polycondensate

A mixture of 126 g of melamine (1 mole), 324 g of 37% formaldehyde solution (4 mole formaldehyde), 2000 ml of desalinated water, 0.5 g of polyvinyl alcohol (degree of hydrolysis 98–99 mole %, viscosity of a 4% aqueous solution in the Höppler viscosimeter DIN 53 015 at 20° C.: approximately 4 cP) and 0.5 g of an ethylene oxide-propylene oxide block copolymer, MG 4100, always from 50% by weight of polyoxyethylene and polyoxypropylene (produced by addition of ethylene oxide to polyoxypropylene with MG 2050), is adjusted with 2N NaOH to pH 9, and is stirred for 30 minutes at 75° C. The precipitation and processing are carried out as in Example 4(a). Yield: 185 g.

(b) Production of a Molding Material According to the Invention 1000 g of the trioxane copolymer, 4 g of MF-polycondensate, 4 g of hexanediol-bis-3-(3',5'-di-tert. butyl-4'-hydroxyphenyl)-propionate and 1 ml of an aqueous 0.1% sodium carbonate solution are homogenized, extruded and further processed as described in Example 1(b).

The loss in weight of the product amounts to 3.1% after 2 hours of heating in air at 220° C. Its solidification time is 36.4 seconds.

EXAMPLE 6

(a) Production of a Melamine-formaldehyde Polycondensate

A mixture of 126 g of melamine (1 mole), 130 g of 37% formaldehyde solution (1.6 mole formaldehyde), 713 ml of desalinated water, 3.24 g of gelatin (DAB 7) and 0.8 g of sodium carboxymethylcellulose (average degree of substitution 0.7, viscosity in 2% solution measured according to Höppler at 20° C.: 29 cP) is adjusted with 2 ml of 10% KOH to pH 8.5 and is heated to 75° C. for 30 minutes while stirring. The pH value, which now amounts to 8.0, is lowered to 6.5 by addition of 4 ml of 10% sulfuric acid. After 7 minutes, the mixture becomes cloudy. The temperature is raised to 90° C. and condensation is continued for 1.5 hours. After that the suspension has a pH value of 5.4. By the addition of 2.5 ml of 10% KOH, this is adjusted to a pH 7.5, the mixture is filtered hot, washed neutral and dried at 80° C./20 torr. Yield: 157 g.

(b) Production of a Molding Material According to the Invention 1000 g of the trioxane copolymer, 4 g of MF-polycondensate, 4 g of N,N'-hexamethylene-bis-3-(3',5'-di-tert. butyl-4'-hydroxyphenyl)-propionamide and 4 ml of aqueous 0.1% sodium carbonate solution are homogenized, extruded and further processed as described in Example 1(b). The product obtained has a loss of weight of 0.91% after 2 hours of heating at 220° C. in air. Its stability is far better than that of a comparative product without melamine-formaldehyde polycondensate.

COMPARATIVE EXPERIMENT 2

1000 g of the trioxane copolymer and 4 g of N,N'-hexamethylene-bis-3-(3',5'-di-tert. butyl-4'-hydroxyphenyl)-propionamide are homogenized, extruded and further processed as described in Example 1(b). The comparative product loses 9.4% of its weight during 2 hours of heating to 220° C. in air.

EXAMPLE 7

(a) Production of a Melamine-formaldehyde Polycondensate

A mixture of 63 g of melamine (0.5 moles), 162 g of a 37% formaldehyde solution (2 mole formaldehyde) and 1500 ml of desalinated water is heated to 60° C. while stirring for 30 minutes. It then has a pH value of 7.1. After raising the temperature to 75° C., the precondensate is mixed while stirring intensively with a solution of 5 g of gelatin (DAB 7) in 450 ml of desalinated water, the temperature of which likewise is 75° C. The mixture has a pH value of 6.35. After 3-4 minutes, the mixture becomes turbid, the temperature is now raised to 95° C. and the polycondensation is continued for another 1.5 hours. After that the suspension has a pH value of 5.5. By the addition of 2 ml of 10% KOH, the pH is adjusted to 7.5, it is filtered, washed neutrally and dried at 80° C./20 torr. Yield: 92.5 g.

(b) Production of a Molding Material According to the Invention 1000 g of the trioxane copolymer, 8 g of MF-polycondensate, 4 g of hexanediol-bis-3-(3',5'-di-tert. butyl-4'-hydroxyphenyl)-propionate and 10 ml of an aqueous 0.1% sodium carbonate solution are homogenized, extruded and further processed as stated in Example 1(b). The product obtained loses 2.4% of its weight during 2 hours of heating at 220° C. in air. Its solidification time is 17.4 seconds.

EXAMPLE 8

(a) Production of a Melamine-formaldehyde Polycondensate

A mixture of 189 g of melamine (1.5 mole), 243 g of 37% formaldehyde solution (3.0 mole formaldehyde) and 750 ml of desalinated water is heated to 60° C. while stirring for 30 minutes. It then has a pH value of 7.2. After raising the temperature to 75° C., the precondensate is mixed with a solution of 5.6 g of gelatin (DAB 7) and 1.4 g of sodium carboxymethylcellulose (average degree of substitution 0.7, viscosity in 2% solution measured according to Höppler at 20° C.: 29 cP) in 510 ml of desalinated water, the temperature of which likewise is 75° C. The mixture has a pH value of 6.8. After 8-9 minutes, the mixture becomes cloudy, the temperature is raised to 95° C. and the polycondensation is continued for another 1.5 hours. After that, the suspension has a pH value of 6.5. By the addition of desalinated water, the weight of the mixture is adjusted precisely to 1600 g, the mixture is divided and then half is worked up in the same manner as in Example 7(a). The yield in relation to the entire mixture: 248 g. Concentration of the suspension on MF-polycondensate: 15.5%.

(b) Production of a Molding Material according to the Invention 1000 g of the trioxane copolymer, 25.8 g of a suspension of the MF-polycondensate (15.5%), 4 g of hexanediol-bis-3-(3',5'-di-tert. butyl-4'-hydroxyphenyl)-propionate and 2 ml of aqueous 0.1% sodium carbonate solution are homogenized, extruded and further processed as stated in the Example 1(b). The product obtained loses 2.7% of its weight during 2 hours of heating at 220° C. in air.

EXAMPLE 9

(a) Production of a Melamine-formaldehyde Polycondensate

A mixture of 126 g of melamine (1 mole), 3.05 g of ethanolamine (0.05 mole), 108 g of 37% formaldehyde solution (1.33 mole formaldehyde) and 600 ml of desalinated water is heated to about 60° C. while stirring for 30 minutes; after that it has a pH value of 7.7. After raising the temperature to 75° C., the precondensate is mixed with a solution of 3.4 g of gelatin (DAB 7) and 0.85 g of sodium carboxymethylcellulose (average degree of substitution 0.7, viscosity in 2% solution, measured according to Höppler at 20° C.: 29 cP) in 185 ml of desalinated water, the temperature of which likewise is about 75° C. The pH value of the mixture is lowered from 7.4 to 6.35, while stirring intensively, by the addition of 15 ml of 10% sulfuric acid. 6 minutes later, the mixture becomes cloudy. The polycondensation is continued for 1.5 hours at about 90° to 95° C. Subsequently, the pH value is raised from 5.95 to 7.3 by the addition of 10 ml of 10% KOH, the mixture is filtered, washed neutrally and dried. Yield: 151 g.

(b) Production of a Molding Material according to the Invention 1000 g of the trioxane copolymer, 4 g of MF copolycondensate, 4 g of N,N'-hexamethylene-bis-3-(3',5'-di-tert. butyl-4'-hydroxyphenyl)-propionamide and 3 ml of an aqueous 0.1% sodium carbonate solution are homogenized, extruded and further processed as stated in Example 1(b). The product obtained loses 0.8% of its weight after 2 hours of heating at 220° C. in air.

EXAMPLE 10

(a) Production of a Melamine-formaldehyde Polycondensate

A mixture of 126 g of melamine (1 mole), 108 g of 37% formaldehyde solution (1.33 mole formaldehyde) and 500 ml desalinated water is heated to about 75° C. while stirring for 30 minutes, and after that it is mixed with a solution of 3.15 g of gelatin (DAB 7) and 0.8 g of sodium carboxymethylcellulose (average degree of substitution 0.7, viscosity in 2% solution measured according to Höppler at 20° C.: 29 cP) in 230 ml. of water, which has about the same temperature. By the addition of 2 ml of 10% sulfuric acid, the pH value is adjusted to 6.4. After that, the temperature is raised to 90°-95° and the polycondensation is continued for 1.5 hours. The pH value is raised from 5.35 to 7.8 by the addition of 3 ml of 10% KOH, the mixture is filtered, washed neutrally and dried. Yield: 157 g.

(b) Production of a Molding Material According to the Invention 1000 g of the trioxane copolymer, 4 g of MF-polycondensate, 4 g of tetrakis-[methylene-3-(3',5'-di-tert. butyl-4'-hydroxyphenyl)-propionate]-methane and 2 ml of 0.1% sodium carbonate solution are homogenized, extruded and further processed as described in Example 1(b). The product obtained loses 3.3% of its weight after 2 hours of heating at 220° C. in air. Its stability is considerably better than that of a comparative product without melamine-formaldehyde polycondensate.

COMPARATIVE EXPERIMENT 3

1000 g of the trioxane copolymer and 4 g of tetrakis-[methylene-3-(3',5'-di-tert. butyl-4'-hydroxyphenyl)-propionate]-methane are homogenized, extruded and further processed exactly as described in Example 1(b). The comparative product in this case loses 6.3% of its weight after 2 hours of heating at 220° C. in air.

EXAMPLE 11

(a) Production of a Melamine-formaldehyde Polycondensate

A mixture of 101 g of melamine (0.8 mole), 390 g of 37% formaldehyde solution (4.8 mole formaldehyde), 500 ml of desalinated water and 0.5 ml of 10% KOH is stirred while heating, maintained at 60° C. for about 30 minutes and the temperature is then raised to 75° C. After that, the precondensate is mixed with a solution of 4.9 g of gelatin (DAB 7) adjusted to about the same temperature and 1.25 g of sodium carboxymethylcellulose (average degree of substitution 0.7, viscosity in 2% solution measured according to Höppler at 20° C.: 29 cP) in 490 ml of desalinated water. The mixture which has a pH of 6.25 becomes cloud after 6 minutes. The polycondensation is continued for 1.5 hours at 90°-95° C. During this time, the pH value drops to 5.85. Subsequently, this is filtered hot, washed in desalinated water and dried. Yield: 173 g.

(b) Production of a Molding Material According to the Invention 1000 g of the trioxane copolymer, 4 g of MF-polycondensate 4 g of 1,3,5-trimethyl-2,4,6-tris-(3',5'-di-tert. butyl-4'-hydroxybenzyl)-benzol and 4 ml of 0.1% sodium carbonate solution are homogenized, extruded and further processed as stated in Example 1(b). After 2 hours of heating at 220° C. in air, the product obtained loses 3.1% of its weight. Its stability is by far better than that of a comparative product without melaminefor-maldehyde polycondensate.

COMPARATIVE EXAMPLE 4

1000 g of the trioxane copolymer and 4 g of 1,3,5-trimethyl-2,4,6-tris-(3',5'-di-tert. butyl-4'-hydroxyben-zyl)-benzol are homogenized, extruded and further processed just as described in Example 1(b). The comparative product loses 11.5% of its weight after 2 hours of heating at 220° C. in air.

EXAMPLE 12

(a) Production of a Melamine-formaldehyde Polycondensate

A mixture of 252 g of melamine (2.0 mole), 211 g of 37% formaldehyde solution (2.6 mole formaldehyde) and 1000 ml of desalinated water is heated (final temperature 90° C.) while stirring for 30 minutes; it then has a pH value of 7.5. Now the precondensate is mixed with an approximately 60°-70° C. hot solution of 6.6 g of gelatin (DAB 7), 1.65 g of sodium carboxymethylcellulose (average degree of substitution 0.7, viscosity in a 2% solution measured according to Hoppler at 20° C.: 29 cP), 3.8 ml of 10% sulfuric acid and 515 ml of desalinated water. The mixture has a pH value of 6.5. The batch becomes cloudy after about 5 minutes. The polycondensation is continued for another 1.5 hours at temperatures between 90° and 100° C. After that, the suspension, which has a pH value of 5.8, is adjusted to a pH value of 8.1 by the addition of 5 ml of 10% KOH, and is then filtered hot. The polycondensate is washed thoroughly and then dried. Yield: 296 g.

(b) Production of a Molding Material According to the Invention 6000 g of the trioxane copolymer, 24 g of MF-polycondensate, 24 g of hexanediol-bis-3-(3',5'-di-tert. butyl-4'-hydroxyphenyl)-propionate and 24 ml of an aqueous 0.1% sodium carbonate solution are mixed, extruded and further treated as stated in Example 1(b). After the extrusion, the coating which has formed on the viewing glass of the first vacuum connection is weighed and in addition its nitrogen content is determined. Weight of the coating: 9.2 mg, nitrogen content: 0.0%.

Volatile, but easily condensable products in the granulate are determined in the following manner: 10 g of granulate is heated for 2 hours in a sublimation apparatus at about 0.8 torr in an aluminum block heated to 250° C. The inside temperature reaches about 217°-220° C. The coating on the cooling finger is weighed and is investigated for nitrogen. Weight of the coating: 9.4 mg; nitrogen content: 0.55%.

The solidification behavior of the granulate is determined in accordance with the DSC method described. Solidification time: 35.0 seconds.

COMPARATIVE EXAMPLE 5

(a) Production of a Water Soluble Melamine-formaldehyde-polycondensate

According to Example 2 of German OS 1,694,097, 10 g of melamine, 2 g of triethanolamine and 6 ml of formalin 30%, are boiled for 30 minutes in 150 ml of water. The content of solid substance in the aqueous solution, determined by 5 hours of drying at 65°/20 torr, is 7.9%.

(b) Production of a Molding Material with the Use of the Above-described Polycondensate 2000 g of the trioxane copolymer are mixed with 101 g of the aqueous solution of the melamine-formaldehyde polycondensate (corresponding to 8 g of polycondensate) from Comparative Example 5(a), and the water is removed by drying at about 65° C./20 torr. Subsequently, 8 g of hexanediol-bis-3-(3',5'-di-tert. butyl-4'-hydroxyphenyl)-propionate are mixed in. The mixing and the subsequent extruding as well as the further processing are carried out as described in Example 1(b).

After extrusion, the coating which has formed on the viewing glass of the first vacuum connection is weighed, and moreover, its content of nitrogen is determined. Weight of the coating: 96 mg; nitrogen content: 64.0%.

The determination of volatile portions in 10 g of granulate is carried out as described in Example 12(b). The weight of the coating on the cooling finger: 18.3 mg; nitrogen content: 26.6%.

The solidification behavior of the granulate is determined in accordance with the DSC method described. Solidification time: 49.8 seconds.

Comparison of the Results from Example 12 with Comparative Example 5:

| | Melamine-sublimation from 1 kg POM on the viewing glass of the extruder | Melamine-sublimation from 10 g POM (sublimation test) | Solidification Time |
|---|---|---|---|
| Example 12 | 0.0 mg | 0.08 mg | 35.0 sec. |
| Comparative Example 5 | 45.6 mg | 7.30 mg | 49.8 sec. |

The quantities stated have been calculated from the nitrogen content of the coating.

What is claimed is:

1. In a molding composition comprising a polyoxymethylene, a melamine formaldehyde polycondensate and an antioxidation agent, the improvement wherein said melamine formaldehyde polycondensate is a finely divided, cross-linked substantially water insoluble polycondensate comprising the precipitation product obtained by reacting formaldehyde and melamine in a molar ratio between 1.2:1 and 10.0:1; and wherein said polycondensate is in an amount of about 0.001 to about 30 percent by weight, related to the total weight of said composition.

2. Composition according to claim 1 wherein said composition includes at least one polyoxymethylene molding additive.

3. Composition according to claim 1 wherein said polyoxymethylene has a crystalline melting point of about 140° C. to about 180° C., a density of about 1.38 to about 1.45 g/ml (DIN 53 479), and a viscosity of at least about 30 ml/g when measured at 135° C. with a solution of 0.5 g polyoxymethylene in 100 ml dimethylformamide containing 2% by weight diphenylamine; said polycondensate has a primary particle size less than about 1 $\mu$m, a specific surface up to about 250 m$^2$/g, and which comprises the product obtained by reacting said formaldehyde and said melamine in an aqueous solution or dispersion to form a soluble precondensate, and then precipitating and cross-linking said soluble precondensate; and said antioxidant is in an amount of about 0.001 to about 2% by weight, related to the weight of said polyoxymethylene.

4. Composition according to claim 3 wherein at least a portion of said polycondensate has a primary particle size less than about 0.1 $\mu$m.

5. Composition according to claim 1 wherein said polycondensate is in an amount of about 0.1 to about 5% by weight, related to the total weight of said composition.

6. Composition according to claim 1 wherein said polycondensate is in an amount of about 0.08 to about 1.0% by weight, related to the total weight of said composition.

7. Composition according to claim 1 wherein the mole ratio of formaldehyde: melamine is between about 1.2:1 and about 2.0:1.

8. Composition according to claim 1 wherein cross-linking to said melamine formaldehyde polycondensate is carried out at a pH of about 5.0 to about 6.9.

9. Composition according to claim 1 wherein cross-linking of said melamine formaldehyde polycondensate is carried out at a pH of about 6.0 to about 6.9.

10. Composition according to claim 1 wherein said cross-linking is carried out in the presence of a buffer.

11. Composition according to claim 1 wherein said polyoxymethylene is a homopolymer of formaldehyde, a homopolymer of trioxane or a copolymer of trioxane.

12. Composition according to claim 2 wherein said molding additive is selected from the group consisting of heat stabilizing agents; UV absorbers and light protective agents; fillers; reinforcing agents; lubricants; auxiliary processing agents; nucleating agents; pigments; dyes; and fire-retardant agents, or mixtures of these substances.

13. Composition according to claim 1 in which said polyoxymethylene is a copolymer of trioxane and 1,3-dioxepane.

14. In a molding composition comprising a polyoxymethylene, a melamine formaldehyde polycondensate and an antioxidation agent, the improvement wherein said melamine formaldehyde polycondensate is a cross-linked, substantially water insoluble polycondensate having a particle size of less than about 10 $\mu$m, said polycondensate comprising a precipitation product obtained by reacting formaldehyde and melamine in a molar ratio between 1.2:1 and 10.0:1; and wherein said polycondensate is in an amount of about 0.001 to about 30% by weight related to the total weight of said composition.

15. Composition according to claim 14 in which said particle size is less than about 5 $\mu$m.

16. Composition according to claim 15 in which said particle size is less than about 2 $\mu$m.

17. Composition according to claim 1 wherein said composition contains a mixture of polyoxymethylenes.

18. Composition according to claim 1 wherein said composition contains a mixture of antioxidants.

19. A molded article comprised of the composition of claim 1.

20. A molded article comprised of the composition of claim 14.

* * * * *